United States Patent Office 3,178,261
Patented Apr. 13, 1965

3,178,261
PRODUCTION OF POTASSIUM FLUOBORATE
Jack J. Lewis, Lakeland, and Dewey H. Griffin, Plant City, Fla., assignors to Smith-Douglass Company, Incorporated, Norfolk, Va., a corporation of Virginia
No Drawing. Filed June 9, 1961, Ser. No. 115,909
15 Claims. (Cl. 23—59)

This invention relates to the production of potassium fluoborate, and more particularly to a process for producing a granular, substantially silicon-free potassium fluoborate product.

Potassium fluoborate is a valuable article of commerce, one of its most important uses being that of a deoxidizer in the manufacture of metallic aluminum. The requirements for marketable potassium fluoborate are stringent; it must be granular for ease in handling, free from colored specks and coarse contaminants and have a silicate content of not more than 0.15% $K_2SiF_6$ by weight (equivalent to 0.0093% Si by weight). The processes heretofore known and used to produce potassium fluoborate are costly and inefficient or result in a very finely divided product that is difficult and expensive to handle and use or in a product contaminated with excessive amounts of deleterious impurities such as silicon. For example, in one prior art process anhydrous borax is reacted with concentrated hydrofluoric acid to produce sodium fluoborate and fluoboric acid which is then reacted with potassium chloride to precipitate the desired potassium fluoborate product. However, the process is wasteful of fluorine, it requires the use of process equipment resistant to attack by concentrated hydrofluoric acid and fumes, and the potassium fluoborate product has an objectionably fine particle size. Another prior art process employs a plant liquor recovered in the course of the thermal defluorination of phosphate rock which comprises essentially a dilute solution of hydrofluoric acid together with minor amounts of hydrofluorosilicic acid, phosphoric acid and other impurities. This plant liquor is first reacted with anhydrous borax and the resulting sodium fluoborate and fluoboric acid is then reacted with potassium chloride to precipitate the desired potassium fluoborate product. Again the resulting potassium fluoborate product is very finely divided (over 90% of the product having a particle size smaller than 200 mesh and over 20% having a particle size smaller than 325 mesh), and it contains an objectionably large amount of silicon in the form of potassium fluosilicate.

We have now discovered a new process for producing potassium fluoborate by means of which a granular fluoborate product is obtained that is free from deleterious impurities and in particular is essentially free from silicon even when the starting materials themselves are contaminated with fluosilicates. Our new process for producing granular potassium fluoborate comprises adding a water soluble inorganic potassium compound which will not form insoluble boron compounds other than potassium fluoborate to an aqueous solution of hydrofluoric acid, thereafter adding to the aqueous solution an inorganic boron compound which will not form insoluble fluorides or fluoborates other than potassium fluoborate, reacting the boron compound with the potassium compound and the hydrofluoric acid to precipitate potassium fluoborate, and separating and drying the precipitate to recover a granular potassium fluoborate product at least about 50% by weight of which has a particle size larger than 200 mesh and at least about 90% of which has a particle size larger than 325 mesh (Tyler Standard Screen). The hydrofluoric acid starting material frequently contains minor amounts of hydrofluosilicic acid and other soluble fluosilicates, and by means of our new process substantially complete removal of the fluosilicate content of the reaction mixture or solution may be effected. Thus, when the starting materials contain a significant amount of fluosilicates or hydrofluosilicic acid, an additional amount of the water soluble potassium compound is added to the initial solution to precipitate the silicon content thereof in the form of potassium fluosilicate which is then removed from the solution by filtration or the like. The resulting silicon-free aqueous solution of the potassium compound and hydrofluoric acid is then reacted with the water soluble boron compound in accordance with our invention to obtain a granular potassium fluoborate product containing less than about 0.1% $K_2SiF_6$, by weight.

Our process may be carried out in any suitable reaction vessel resistant to attack by hydrofluoric acid in the concentrations and at the reaction temperatures employed. The temperature at which the reaction is carried out is not critical although we have found that as the reaction temperature is increased there is a significant increase in the particle size of the potassium fluoborate product obtained, and we presently prefer to employ reaction temperatures of between about 90 and 160° F. In addition to the reaction temperature, the particle size of the potassium fluoborate precipitate appears to be a function of several other factors including the rate of boron compound addition, the reaction time, the specific boron compound employed and the hydrofluoric acid concentration. Generally speaking, a coarser precipitate is produced with a relatively low rate of boron compound addition, a relatively long reaction time (e.g. 1 to 8 hours), and a relatively low acid concentration. However, none of these factors are critical in themselves, and the only limitations with regard to them are those imposed by inherent physical factors such as, for example, the boiling point of the reaction mixture and the like. One essential reaction condition is that the water soluble potassium compound be thoroughly mixed with the hydrofluoric acid solution before the water soluble boron compound is added thereto. Moreover, when it is desired to produce a silicon-free potassium fluoborate product from an initial reaction solution containing hydrofluosilicic acid, the reaction solution should be filtered or otherwise treated to remove precipitated potassium fluosilicate therefrom prior to the addition of the boron compound thereto.

Any readily available source of hydrofluoric acid may be used in the practice of our invention provided the acid contains no impurities which will form a significant amount of insoluble boron compounds (other than potassium fluoborate) when the water soluble inorganic boron compound is added thereto in accordance with our process. Thus, we have found that the so-called "plant liquor" recovered as a by-product of the thermal defluorination of phosphate rock is a useful source of dilute hydrofluoric acid although this acid contains a number of impurities. For example, a typical plant liquor comprises an aqueous solution containing about 4 to 6% by weight of hydrofluoric acid, about 0.5 to 0.8% by weight of hydrofluosilicic acid and about 0.5 to 1.5% by weight of phosphoric acid together with minor amounts of other non-deleterious impurities. The concentration of the hydrofluoric acid in the initial reaction solution is not critical although we presently prefer that the solution contain between 3 and 20% by weight HF. In general, we have found that an increase in the hydrofluoric acid concentration results in an increase in the yield of potassium fluoborate product obtained and in a decrease in the crystal size of the product. However, as the acid concentration is increased the tendency of the crystals of potassium fluoborate product to form aggregates appears to increase, thus offsetting to some extent the tendency of the product to form smaller crystals with increasing acid concentration.

The potassium compounds useful in the practice of our invention include all water soluble inorganic potassium compounds which will not form a significant amount of insoluble boron compounds (other than potassium fluoborate) when the boron compound is subsequently added to the reaction solution. The most convenient and least expensive source of potassium is potassium chloride, although other water soluble potassium salts such as potassium sulfate, potassium nitrate and the like can be used with equally satisfactory results. Moreover, such alkaline potassium compounds as potassium carbonate and potassium hydroxide can also be used with satisfactory results provided care is exercised when they are added to the reaction solution in order to prevent local high concentration of alkali which may result in decomposition of the potassium fluosilicate precipitate initially produced and thereby interfere with proper silicon removal. The amount of the potassium compound added to the reaction solution is not critical, although preferably a stoichiometric amount of the compound is employed—namely, an amount sufficient to react with the hydrofluosilicic acid and other dissolved fluosilicates present in the initial reaction solution to form an equivalent amount of potassium fluosilicate plus an amount sufficient to react with the hydrofluoric acid present in the solution to form an equivalent amount of potassium fluoborate (i.e., two mols of the potassium compound (calculated as equivalent KCl) for every mol of dissolved fluosilicates (calculated as equivalent $H_2SiF_6$) plus one mol of the potassium compound (calculated as equivalent KCl) for every four mols of hydrofluoric acid present in the initial reaction solution).

The boron compounds useful in the practice of our invention include all inorganic boron compounds which are soluble in water or dilute hydrofluoric acid and which will not form a significant amount of insoluble fluorides (other than potassium fluoborate) when the boron compound is added to the hydrofluoric acid-containing reaction solution. We presently prefer to use anhydrous borax as the source of boron, although other water or acid soluble boron compounds such as the borax hydrates, boric acid, boric acid anhydride, metaboric acid and the like can also be employed with equally satisfactory results. The amount of the boron compound added to the reaction solution is not critical, although preferably a stoichiometric amount of this compound is employed—namely, an amount sufficient to react with the hydrofluoric acid present in the solution to form an equivalent amount of potassium fluoborate (i.e., one mol of boron for every four mols of hydrofluoric acid present in the reaction solution). The boron compound can be added to the reaction solution either as a solid or in an aqueous solution, and it can be added to the reaction solution all at once or over a period of several hours. However, we have found that the particle size of the potassium fluoborate product is somewhat increased if the boron compound is added gradually over a period of time rather than all at once, and we presently prefer to add the boron compound (e.g., anhydrous borax) in solid form gradually over a period of from 1 to 8 hours.

The following examples are illustrative but not limitative to the practice of our invention:

EXAMPLE I

The effect of the order in which the potassium and boron reactants are added to the hydrofluoric acid-containing reaction solution on the particle size of potassium fluoborate product is demonstrated by the comparative test procedures reported below, each test procedure utilizing the same reactants but reversing the order of their addition to the acid-containing reaction solution. The results reported in connection with each test procedure are the average results obtained from a number of tests or runs employing the respective procedures.

The source of hydrofluoric acid employed in both test procedures was the plant liquor recovered as a by-product of the thermal defluorination of phosphate rock, the plant liquor comprising an aqueous solution containing about 4 to 6% HF, about 0.5 to 0.8% $H_2SiF_6$ and about 0.5 to 1.5% $H_3PO_4$, together with minor amounts of other unimportant impurities. The boron compound employed in both procedures was anhydrous borax, and the potassium compound was a 20% aqueous solution of potassium chloride.

The first test procedure (Procedure A) was representative of known processes for making potassium fluoborate. In this procedure a stoichiometric amount of anhydrous borax was first added to the plant liquor and reacted therewith with the resultant formation of sodium fluoborate and fluoboric acid. On completion of this reaction a stoichiometric quantity of the aqueous solution of potassium chloride was added to the reaction solution with the resultant formation of potassium fluoborate precipitate and sodium fluoride. In addition, an appreciable amount of insoluble sodium and potassium fluosilicates were formed which appeared as a contaminant in the final potassium fluoborate product. The precipitated potassium fluoborate product was recovered from the reaction solution and then dried. The dry product was then analyzed to determine its silicon content and the percent recovery (or yield) of the fluorine content of the original reaction solution (i.e., the plant liquor), and screened to determine its particle size with the results which are reported in Table 1.

The second test procedure (Procedure B) was representative of our new process for making potassium fluoborate. In this procedure a stoichiometric quantity of the aqueous solution of potassium chloride was first added to the plant liquor, this mixture agitated for several hours, cooled to below 105° F. and the precipitated potassium fluosilicate then removed therefrom. The substantially silicon-free reaction solution was then reacted with a stoichiometric quantity of anhydrous borax which was added to the solution gradually over a period of over 3 hours, the temperature of the reaction solution being between 110 and 125° F. during this period. Upon completion of the boron addition the reaction solution was agitated for more than 30 minutes to insure complete solution and reaction of all the borax, the precipitated potassium fluoborate allowed to settle, the liquid largely drawn off and the solid product centrifuged and dried. The dry product was then analyzed to determine its silicon content an the percent recovery of the fluorine content of the original reaction solution, and screened to determine its particle size with the results reported in Table 1 which follows.

Table 1

| Product analysis | Procedure A | Procedure B |
| --- | --- | --- |
| Yield (percent fluorine) | 65–69 | 70–72 |
| Si content (percent by weight) | 0.59 | 0.0045 |
| Screen size: | Percent | Percent |
| +48 | 0.0 | 3.1 |
| −48 +65 | 0.0 | 31.0 |
| −65 +100 | 0.5 | 41.0 |
| −100 +150 | 1.0 | 18.2 |
| −150 +200 | 7.7 | 5.1 |
| −200 +325 | 64.7 | 1.3 |
| −325 | 26.1 | 0.3 |
|  | 100.0 | 100.0 |

As will be seen from the foregoing table the particle size of the potassium fluoborate product obtained by known Procedure A is too fine for ease in handling and freedom from dust losses in that over 90% of the product will pass through a 200 mesh screen, whereas the particle size of the potassium fluoborate product of our new process is far coarser and more granular in that well over 90% of the product is larger than 200 mesh. Moreover, the product obtained by Procedure A contains an amount of silicon (in the form of fluosilicates) that would be considered excessive for most purposes whereas the product of Procedure B is substantially free of silicon, and our new process results in an increase in fluorine recovery as compared with the known procedure.

EXAMPLE II

Comparative tests of our new process were conducted to determine the effect, if any, of different rates of boron compound addition on the particle size of the potassium fluoborate product and the percent of fluorine recovered. In both of these comparative tests the initial reaction solution contained 5% by weight of hydrofluoric acid to which was added a stoichiometric amount of potassium chloride. After thorough mixing, a stoichiometric amount of anhydrous borax was added to the reaction solution, this boron compound being added to one test solution (Test A) within a period of three minutes and being added to the other test solution (Test B) gradually over a period of one hour. Both reaction solutions were at ambient temperature, and the total reaction time in both instances was one hour from the start of the addition of the boron compound. On completion of the reaction, the precipitated potassium fluoborate was recovered, dried and analyzed to determine the percent fluorine recovery and particle size. The pertinent reaction conditions and the analysis of the fluoborate product are set forth in Table 2 which follows.

Table 2

|  | A | B |
|---|---|---|
| Reaction conditions: |  |  |
| HF concentration, percent | 5.0 | 5.0 |
| Boron compound | $Na_2B_4O_7$ | $Na_2B_4O_7$ |
| Time of boron addition | 1 3 | 2 1 |
| Reaction temperature | Ambient | Ambient |
| Reaction time, hr | 1 | 1 |
| Product analysis: |  |  |
| Yield (percent F) | 82.8 | 82.8 |
| Screen size: | Percent | Percent |
| +48 | 0.9 | 3.0 |
| −48 +65 | 2.1 | 5.6 |
| −65 +100 | 7.6 | 21.1 |
| −100 +150 | 13.2 | 23.4 |
| −150 +200 | 27.3 | 23.3 |
| −200 +325 | 39.9 | 18.5 |
| −325 | 9.0 | 5.1 |
|  | 100.0 | 100.0 |

[1] Minutes.  [2] Hour.

From the foregoing it will be seen that the rate of boron compound addition appears to have little effect on the percent fluorine recovery, but that the particle size of the fluoborate product is somewhat coarser when a relatively slow rate of boron compound addition is used than when a fast rate of addition is used.

EXAMPLE III

A series of comparative tests of our process were conducted to determine the effect of various hydrofluoric acid concentrations on the particle size of the potassium fluoborate product and on the percent of fluorine recovered. In one test (Test A) the initial reaction solution contained 4.73% by weight HF, in the second test (Test B) the initial reaction solution contained 9.89% by weight HF, and in the third test (Test C) the initial reaction solution contained 19.72% by weight HF. In all three tests a stoichiometric amount of potassium chloride was added to the reaction solution, and after thorough mixing a stoichiometric amount of anhydrous borax was then added to the reaction solution gradually over a period of one hour. In all cases the reaction solution was at ambient temperature and the time of the reaction was one hour from the start of the borax addition. On completion of the reaction the potassium fluoborate precipitate was recovered, dried and analyzed to determine the percent of fluorine recovery and particle size of the respective fluoborate products. The results of this analysis are set forth in the following table:

Table 3

|  | A | B | C |
|---|---|---|---|
| Reaction conditions: |  |  |  |
| HF concentration, percent | 4.73 | 9.89 | 19.72 |
| Boron compound | $Na_2B_4O_7$ | $Na_2B_4O_7$ | $Na_2B_4O_7$ |
| Time of boron addition, hr | 1 | 1 | 1 |
| Reaction temperature | Ambient | Ambient | Ambient |
| Reaction time, hr | 1 | 1 | 1 |
| Product analysis: |  |  |  |
| Yield (percent F) | 84.5 | 91.2 | 98.0 |
| Screen size: | Percent | Percent | Percent |
| +48 | 0.3 | 0.7 | 2.8 |
| −48 +65 | 2.2 | 1.6 | 4.5 |
| −65 +100 | 9.8 | 5.1 | 14.6 |
| −100 +150 | 45.0 | 17.1 | 13.4 |
| −150 +200 | 24.2 | 31.1 | 21.6 |
| −200 +325 | 16.6 | 39.7 | 37.7 |
| −325 | 1.9 | 4.7 | 5.4 |
|  | 100.0 | 100.0 | 100.0 |

As will be seen from the foregoing results, an increase in the concentration of hydrofluoric acid results in an increase in the percent of fluorine recovered and also in a decrease in the crystal size of the potassium fluoborate product obtained (as can best be seen by comparing the minus 325 mesh fractions). However, the tendency of the crystals to decrease in size due to an increase in acid concentration is somewhat offset by an increase in the tendency of the crystals to form aggregates of relatively large size (as can best be seen by comparing the plus 100 mesh fractions).

EXAMPLE IV

A series of comparative tests were conducted to determine the effect of using various boron compounds upon the particle size of the product obtained in the practice of our invention. In each of the four tests the initial reaction solution contained approximately 5% by weight of hydrofluoric acid (with minor variations as noted in Table 4) to which was added a stoichiometric amount of potassium chloride. After thorough mixing, a stoichiometric amount of anhydrous borax was added to one test solution (Test A), a stoichiometric amount of borax decahydrate was added to the second test solution (Test B), a stoichiometric amount of boric acid was added to the third test solution (Test C) and an approximate stoichiometric amount of metaboric acid was added to the 4th test solution (Test D), the boron compounds being added to each test solution gradually over a period of one hour with continuous stirring. In each case the reaction solution was at ambient temperature and the reaction time was one hour from the start of the addition of the boron compound. On completion of the reaction, the precipitated potassium fluoborate product was recovered, dried and analyzed to determine the percent fluorine recovery and particle size of the product. The results of the analysis are set forth in Table 4:

Table 4

|  | A | B | C | D |
|---|---|---|---|---|
| Reaction conditions: |  |  |  |  |
| HF concentration (percent) | 4.73 | 4.96 | 5.13 | 4.82 |
| Boron compound | $Na_2B_4O_7$ | (1) | $H_3BO_3$ | [2]$HBO_2$ |
| Time of boron addition, hr | 1 | 1 | 1 | 1 |
| Reaction temperature | Ambient | Ambient | Ambient | Ambient |
| Reaction time, hr | 1 | 1 | 1 | 1 |
| Product analysis: |  |  |  |  |
| Yield (percent F) | 84.5 | 82.9 | 83.3 | 87.4 |
| Screen size: | Percent | Percent | Percent | Percent |
| +48 | 0.3 | 1.1 | 0.5 | 0.1 |
| −48 +65 | 2.2 | 2.8 | 2.1 | 0.9 |
| −65 +100 | 9.8 | 10.2 | 6.0 | 3.0 |
| −100 +150 | 45.0 | 20.9 | 13.3 | 15.7 |
| −150 +200 | 24.2 | 38.1 | 26.6 | 37.1 |
| −200 +325 | 16.6 | 22.7 | 47.1 | 37.4 |
| −325 | 1.9 | 4.2 | 4.4 | 5.8 |
|  | 100.0 | 100.0 | 100.0 | 100.0 |

[1] $Na_2B_4O_7 \cdot 10H_2O$.
[2] Theoretical composition.

It will be seen from the foregoing table, there is some variation in particle size of the product obtained following the use of various boron compounds, but this variation is not significant or attributable to any factor other than the differences in solubility or reaction rate of the various boron compounds employed. The somewhat higher yield obtained as a result of the use of metaboric acid is in all probability due to the fact that the acid used was of indefinite composition and that calculations were based on its assumed theoretical composition. The tests demonstrate that satisfactory results can be obtained by the use of any of the water soluble inorganic boron compounds referred to.

EXAMPLE V

Comparative tests of our process were carried out to determine the effect of variation in the reaction temperature on the percent recovery of fluorine and on the particle size of the potassium fluoborate product. In both tests the initial reaction solutions contained about 5% hydrofluoric acid (with minor variations as noted in Table 5) to which solutions were added stoichiometric amounts of potassium chloride. After thorough mixing, a stoichiometric amount of anhydrous borax was added to both reaction solutions gradually over a period of one hour. The temperature of one test solution (Test A) was maintained at about 75° F. (i.e. ambient temperature) and the temperature of the other test solution (Test B) was maintained at 150° F., and the reaction time in both cases was one hour from the start of the boron compound addition. On completion of the reaction the precipitated potassium fluoborate product was recovered, dried and analyzed to determine the percent of fluorine recovery and the particle size of the product. The results of the analysis are set forth in Table 5.

Table 5

|  | A | B |
|---|---|---|
| Reaction conditions: |  |  |
| HF concentration, percent | 4.73 | 4.96 |
| Boron compound | $Na_2B_4O_7$ | $Na_2B_4O_7$ |
| Time of boron addition, hr | 1 | 1 |
| Reaction temperature, °F | 75 | 150 |
| Reaction time, hr | 1 | 1 |
| Product analysis: |  |  |
| Yield (percent F) | 84.5 | 78.8 |
| Screen size: | Percent | Percent |
| +48 | 0.3 | 13.1 |
| −48 +65 | 2.2 | 33.3 |
| −65 +100 | 9.8 | 33.5 |
| −100 +150 | 45.0 | 10.5 |
| −150 +200 | 24.2 | 6.0 |
| −200 +325 | 16.6 | 2.9 |
| −325 | 1.9 | 0.7 |
|  | 100.0 | 100.0 |

As will be seen from the foregoing table an increase in the reaction temperature results in a marked increase in the particle size of the potassium fluoborate product accompanied by a small decrease in the percent of fluorine recovered.

EXAMPLE VI

The results of previous tests of our process indicate that the finest potassium fluoborate precipitates are produced when the initial reaction solution contains about 10% hydrofluoric acid, when the boron compound employed is boric acid, when the boron compound is added rapidly to the reaction solution and when the reaction is carried out at ambient temperatures. Comparative tests were conducted to determine the effect of an increase in reaction temperature and the effect of the gradual addition of the boron compound on the particle size of the potassium fluoroborate product when the reaction solution contains about 10% hydrofluoric acid and when the boron compound employed is boric acid. Both initial test solutions contained approximately 10% hydrofluoric acid to which was added a stoichiometric amount of potassium chloride. After thorough mixing a stoichiometric amount of boric acid was added rapidly to one test solution (Test A) and gradually over a period of one hour to the other test solution (Test B). Both reaction solutions were maintained at a temperature of 150° F., and in both cases the reaction time was one hour from the start of the addition of the boron compound. On completion of the reaction the potassium fluoborate precipitate was recovered, dried and analyzed to determine the percent of fluorine recovery and the particle size of the potassium fluoborate product. The results of the test are set forth in Table 6.

Table 6

|  | A | B |
|---|---|---|
| Reaction conditions: |  |  |
| HF concentration, percent | 9.94 | 9.91 |
| Boron compound | $H_3BO_3$ | $H_3BO_3$ |
| Time of boron addition | [1]3 | [2]1 |
| Reaction temperature, °F | 150 | 150 |
| Reaction time, hr | 1 | 1 |
| Product analysis: |  |  |
| Yield (percent F) | 89.7 | 85.7 |
| Screen size: | Percent | Percent |
| +48 | 1.7 | 0.8 |
| −48 +65 | 3.4 | 4.6 |
| −65 +100 | 5.3 | 27.8 |
| −100 +150 | 14.8 | 31.3 |
| −150 +200 | 26.4 | 21.9 |
| −200 +325 | 40.2 | 13.0 |
| −325 | 8.2 | 0.6 |
|  | 100.0 | 100.0 |

[1] Minutes. [2] Hours.

The foregoing test results again demonstrate the significant increase in particle size of the potassium fluoborate product that results from an increase in reaction temperature and from a relatively slow rate of boron compound addition. However, even under conditions least conducive to the formation of large particles of potassium fluoborate, the particle size of the product is far coarser and more granular than that obtained by any previously known process for making potassium fluoborate.

EXAMPLE VII

A series of tests were conducted to determine the effect of using various potassium compounds upon the particle size and yield of the product obtained in the practice of our invention. A synthetic plant liquor was prepared for use in this series of tests, this liquor comprising an aqueous solution containing 4.49% by weight HF, 0.53% by weight $H_2SiF_6$, 0.74% by weight $P_2O_5$ and 0.50% by weight $H_2SO_4$. A stoichiometric amount of five different water-soluble potassium compounds was added to each of five equal samples of the plant liquor (i.e. an amount of the potassium compound theoretically sufficient to react with all of the fluoride and fluosilicate present in the liquor to produce an equivalent amount of potassium fluoborate and potassium fluosilicate). The potassium compounds employed were potassium chloride (Test A), potassium nitrate (Test B), potassium hydroxide (Test C), potassium carbonate (Test D) and potassium sulfate (Test E), and in each test the reaction was carried out at ambient temperature. In the case of potassium hydroxide and potassium carbonate the potassium compound was added to the respective test sample slowly over a period of about 10 minutes in order to minimize decomposition of the potassium fluosilicate precipitate due to local high concentrations of alkali. After thorough mixing the test samples were filtered to remove precipitated potassium fluosilicate. A stoichiometric amount of sodium tetraborate decahydrate (borax) was then added to each test sample filtrate, the borax being added to the filtrate gradually and with continuous agitation over a 55 minute period. Agitation of the test samples was continued five minutes after the last borax addition for an over-all reaction time of one hour. On completion of the reaction the precipitated potassium fluoborate product was recovered, dried and analyzed to determine the percent fluorine recovery, the silicon content and the particle size of the product. The results of the analysis are set forth in Table 7.

*Table 7*

|  | A | B | C | D | E |
|---|---|---|---|---|---|
| Reaction Conditions: |  |  |  |  |  |
| HF concentration (percent) | 4.49 | 4.49 | 4.49 | 4.49 | 4.49 |
| Potassium compound | KCl | KNO₃ | KOH | K₂CO₃ | K₂SO₄ |
| Boron compound | Borax | Borax | Borax | Borax | Borax |
| Time of boron addition, min | 55 | 55 | 55 | 55 | 55 |
| Reaction temperature | Ambient | Ambient | Ambient | Ambient | Ambient |
| Reaction time, hr | 1 | 1 | 1 | 1 | 1 |
| Product Analysis: |  |  |  |  |  |
| Yield (percent F) | 85.0 | 82.1 | 69.4 | 65.7 | 87.7 |
| Silicon content | .0023 | 0.0004 | 0.0013 | 0.0019 | 0.0004 |
| Screen Size | Percent | Percent | Percent | Percent | Percent |
| +48 | 0.1 | 0.1 | 0.1 | 0.1 | 0.1 |
| −48 +65 | 1.6 | 1.2 | 1.0 | 0.9 | 0.9 |
| −65 +100 | 1.3 | 8.4 | 21.4 | 12.6 | 23.5 |
| −100 +150 | 20.8 | 39.5 | 59.7 | 57.9 | 58.5 |
| −150 +200 | 29.5 | 15.9 | 16.9 | 25.7 | 14.4 |
| −200 +325 | 43.8 | 33.8 | 0.9 | 2.7 | 2.3 |
| −325 | 2.9 | 1.1 | 0.0 | 0.1 | 0.3 |
|  | 100.0 | 100.0 | 100.0 | 100.0 | 100.0 |

As will be seen from the foregoing table all of the potassium compounds employed resulted in satisfactory products having a particle size at least 90% of which was larger than 325 mesh (Tyler Standard) and at least 50% of which was larger than 200 mesh.

From the foregoing description of our new process for making potassium fluoborate, it will be seen that we have made an important contribution to the art to which our invention relates.

We claim:

1. In the process for making potassium fluoborate by reaction between hydrofluoric acid, a boron compound and a potassium compound, the improvement which comprises producing a granular potassium fluoborate product at least about 90% of which has a particle size larger than 325 mesh (Tyler Standard) by: (1) adding a water soluble inorganic potassium compound selected from the group consisting of potassium chloride, potassium nitrate, potassium sulfate, potassium carbonate and potassium hydroxide to an aqueous solution of hydrofluoric acid, (2) thereafter adding an inorganic boron compound selected from the group consisting of boric acids, boric acid anhydrides, and sodium salts of boric acids to the resulting potassium- and hydrofluoric acid-containing solution, (3) reacting said boron compound with said potassium and hydrofluoric acid containing solution to precipitate potassium fluoborate, and (4) separating and drying said precipitate to recover the aforesaid granular potassium fluoborate product.

2. Process for producing granular potassium fluoborate at least about 90% of which has a particle size larger than 325 mesh (Tyler Standard) which comprises adding a water soluble inorganic potassium compound selected from the group consisting of potassium chloride, potassium nitrate, potassium sulfate, potassium carbonate, and potassium hydroxide to an aqueous reaction solution of hydrofluoric acid, thereafter adding to the resulting potassium- and hydrofluoric acid-containing reaction solution a hydrofluoric acid soluble inorganic boron compound selected from the group consisting of boric acids, boric acid anhydrides and sodium salts of boric acids, reacting said boron with said potassium compound and hydrofluoric acid containing reaction solution to precipitate potassium fluoborate, and separating and drying said precipitate to recover the aforesaid granular potassium fluoborate product.

3. Process according to claim 2 in which the initial reaction solution contains from about 3% to about 20% by weight hydrofluoric acid.

4. Process according to claim 2 in which the temperature of the reaction solution during the addition of the boron compound thereto is between about 90° and 160° F.

5. Process according to claim 2 in which the boron compound is added to the reaction solution gradually over a period of from 1 to 8 hours.

6. Process for producing granular potassium fluoborate at least about 90% of which has a particle size larger than 325 mesh (Tyler Standard) and at least about 50% of which has a particle size larger than 200 mesh which comprises adding potassium chloride to an aqueous reaction solution containing from about 5% to about 20% by weight hydrofluoric acid, thereafter adding anhydrous borax to the resulting potassium- and hydrofluoric acid-containing reaction solution gradually over a period of from about 1 to 8 hours while maintaining said solution at a temperature of between about 90° and 160° F. during which period said borax reacts with said potassium and hydrofluoric acid containing reaction solution to precipitate potassium fluoborate, and separating and drying said precipitate to recover the aforesaid granular potassium fluoroborate product.

7. Process according to claim 6 in which stoichiometric amounts of potassium chloride and anhydrous borax are added to the reaction solution.

8. Process for producing granular, substantially silicon-free potassium fluoborate from an aqueous solution of hydrofluoric acid containing an appreciable amount of hydrofluosilicic acid as an impurity therein which comprises adding a water soluble inorganic potassium compound selected from the group consisting of potassium chloride, potassium nitrate, potassium sulfate, potassium carbonate and potassium hydroxide to said aqueous solution of hydrofluoric and hydrofluosilicic acids in an amount in excess of that required to react with said hydrofluosilicic acid to form potassium fluosilicate, reacting said potassium compound with said hydrofluosilicic acid to precipitate potassium fluosilicate, removing said precipitated potassium fluorosilicate from said solution to recover a substantially silicon-free potassium- and fluoride-containing reaction solution, adding an inorganic boron compound selected from the group consisting of boric acids, boric acid anhydrides and sodium salts of boric acids to said reaction solution, reacting said boron compound with the excess potassium and hydrofluoric acid in said reaction solution to precipitate potassium fluoborate, and separating and drying said precipitate to recover a granular potassium fluoborate product containing less than 0.01% by weight of silicon and having a particle size such that at least about 90% thereof is larger than 325 mesh (Tyler Standard).

9. Process for producing granular, substantially silicon-free potassium fluoborate from an aqueous solution of hydrofluoric acid containing an appreciable amount of hydrofluosilicic acid as an impurity therein which comprises adding a water soluble inorganic potassium compound selected from the group consisting of potassium chloride, potassium nitrate, potassium sulfate, potassium carbonate and potassium hydroxide to said aqueous solution of hydrofluoric and hydrofluosilicic acids in an amount in excess of that required to react with said hydrofluosilicic acid to form potassium fluosilicate, reacting said potassium compound with said hydrofluosilicic acid to precipitate potassium fluosilicate, removing said precipitated potassium fluosilicate from said solution to recover a substantially silicon-free potassium- and fluoride-containing reaction solution, adding to said reaction solution a hydrofluoric acid soluble inorganic boron compound selected from the group consisting of boric acid, boric acid anhydrides and sodium salts of boric acids, reacting said boron with the excess potassium compound and hydrofluoric acid in said reaction solution to precipitate potassium fluoborate, and separating and drying said precipitate to recover a granular potassium fluoborate product containing less than 0.01% by weight of silicon and having a particle size such that at least about 90% of which is larger than 325 mesh (Tyler Standard).

10. Process according to claim 9 in which the initial reaction solution contains from about 3% to about 20% by weight hydrofluoric acid.

11. Process according to claim 9 in which the temperature of the reaction solution during the addition of the boron compound thereto is between about 90° and 160° F.

12. Process according to claim 9 in which the boron compound is added to the reaction solution gradually over a period of from 1 to 8 hours.

13. Process for producing granular, substantially silicon-free potassium fluoborate from an aqueous solution of hydrofluoric acid containing an appreciable amount of hydrofluosilicic acid as an impurity therein which comprises adding potassium chloride to said aqueous solution of hydrofluoric and hydrofluosilicic acids in an amount in excess of that required to react with said hydrofluosilicic acid to form potassium fluosilicate, reacting said potassium compound with said hydrofluosilicic acid to precipitate potassium fluosilicate, removing said precipitated potassium fluosilicate from said solution to recover a substantially silicon-free potassium- and fluoride-containing reaction solution, adding anhydrous borax to said reaction solution gradually over a period of from about 1 to 8 hours while maintaining said solution at a temperature of between about 90° and 160° F. during which period said borax reacts with the excess potassium and hydrofluoric acid in said reaction solution to precipitate potassium fluoborate, and separating and drying said precipitate to recover a granular potassium fluoborate product containing less than 0.01% by weight of silicon and having a particle size such that at least about 90% thereof is larger than 325 mesh (Tyler Standard) and at least about 50% thereof is larger than 200 mesh.

14. Process according to claim 13 in which the initial reaction solution contains from about 3% to about 20% by weight hydrofluoric acid.

15. Process according to claim 13 in which stoichiometric amounts of potassium chloride and anhydrous borax are added to the reaction solution.

References Cited by the Examiner

UNITED STATES PATENTS 2,738,255  3/56  Sullivan et al. _____ 23—59
2,865,709  12/58  Horn _____ 23—88

OTHER REFERENCES

Mellor: Comprehensive Treatise on Inorganic and Theoretical Chemistry, Longman's, Green & Co., New York, vol. 5, pages 126 and 127 (1924).

MAURICE A. BRINDISI, *Primary Examiner.*